Dec. 14, 1937.   E. BILLINGS ET AL   2,102,054
APPARATUS FOR TREATING CARBON BLACK AND THE LIKE
Original Filed Nov. 16, 1932   2 Sheets-Sheet 2

INVENTORS.
Edmund Billings
and
Harold H. Offutt.
BY Kenway & Witter.
ATTORNEYS.

Patented Dec. 14, 1937

2,102,054

UNITED STATES PATENT OFFICE 2,102,054

APPARATUS FOR TREATING CARBON BLACK AND THE LIKE

Edmund Billings, Weston, and Harold H. Offutt, Winchester, Mass., assignors to Godfrey L. Cabot, Inc., Boston, Mass., a corporation of Massachusetts Original application November 16, 1932, Serial No. 642,850. Divided and this application September 13, 1935, Serial No. 40,438

9 Claims. (Cl. 259—105)

This invention relates to apparatus or machinery for treating carbon black or other flocculent products which have the property of agglomerating into granules when subjected to turbulent agitation under conditions favorable for such change of physical condition.

The present application is a division of our application Serial No. 642,850 filed November 16, 1932, wherein is disclosed and claimed a process of producing granules of carbon black of substantial density and cohesion by subjecting the flocculent carbon black of commerce in a dry state to turbulent agitation and continuing such agitation until the flocculent carbon black agglomerates into granules which are relatively tenacious, self-sustaining and substantially dustless in the mass.

The apparatus which is the subject matter of this application is disclosed in our prior application as one form or type of apparatus satisfactory for carrying out the process of our invention. In practising that invention it is important to maintain the flocculent product over a sufficient length of time under conditions of turbulent pressure such that each particle has freedom of motion and is associated with other particles in sufficient number to insure subjecting the particles to multi-directional pressures and impacts. Commercial carbon black in bulk is very viscous, and for this reason offers considerable resistance to the turbulent motion desired, especially when treated in relatively large bulk. We have discovered that the speed of the process is somewhat enhanced by intensifying the impact nature of this turbulence and that this may be done by subjecting the flocculent product to turbulent pressure between opposing surfaces relatively movable toward and past each other. This action brings the flocculent particles of the product into a most intimate and bombarding relation whereby they are speedily and completely compacted into a relatively hard and dense granular form.

The efficiency of the process and the consistency and value of the product also depend to a large extent upon the uniformity of the treatment of all parts of the product during its turbulent agitation, and for this reason we desire to agitate or move the product transversely of and simultaneously with the turbulent movement imparted thereto. Agitation in the latter sense serves to circulate the bulk of the product continuously during the treatment and thereby tends to keep the product uniform at all times. Thus the carbon black or other particles are agitated in two directions at an angle to each other and, while being kept a uniform consistency, are impacted into a dense granular form by opposition to their movement in these directions and the impacts and encounters to which they are subjected. The principal object of the present invention is to provide improved apparatus for carrying out the process of our invention as above discussed, and while such apparatus may be embodied in various mechanical constructions, its nature will be best understood and appreciated from the following description of a preferred embodiment thereof, selected for purposes of illustration and shown in the accompanying drawings in which,—

Figure 1:
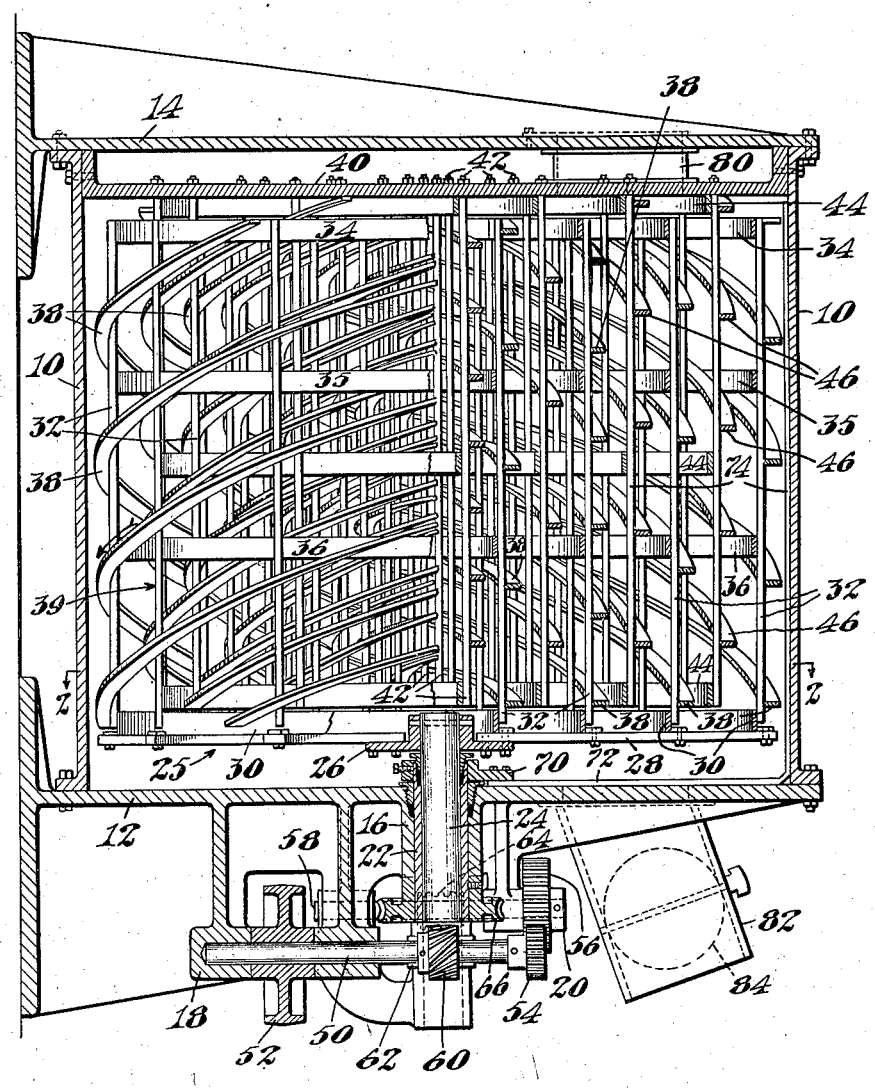
Fig. 1 is a view of the apparatus in vertical section.

The apparatus comprises a stationary vertically-disposed tank or drum 10 which is formed from a cylindrical shell flanged and bolted to bottom and top plates 12 and 14. Depending from the bottom plate is a boss providing a vertical bearing 16 and brackets providing horizontal bearings 18 and 20. Rotatably mounted in the vertical bearing 16 are a sleeve 22 and a shaft 24, the sleeve and shaft extending upwardly into the drum 10 in concentric relation.

Mounted on the upper end of the shaft 24 and within the drum 10 is a rotatable cage 25 supported on a flanged collar 26 pinned to the shaft. This cage comprises a plurality of radially-extending bottom bars 28 supporting thereon four concentric bands 30 disposed edgewise in spaced relation. Carried by each band 30 and extending vertically upward therefrom are a plurality of impelling elements in the nature of parallel vertically disposed rods 32 circular in cross section. The top ends and the intermediate portions of the rods are connected together by similar concentric bands 34, 35 and 36. Also carried by each circular row of rods 32 are one or more spirally arranged straps 38.

An inverted cage 39, similar to the cage 25 supported on the collar 26 and just described, is mounted in stationary position on a plate 40 secured within the upper end of the drum 10. The stationary cage 39 comprises a plurality of circular rows of baffle rods 42, corresponding to the rows of impelling rods 32 and spaced concentrically, carried by and depending from the plate 40. The rods 42 in each row are connected together by three or more bands 44 and each row of rods also has mounted thereon one or more spirally-arranged straps 46, the stationary straps 46 being pitched in the same direction as and arranged in a manner similar to the movable straps 38.

A relative rotary movement is provided between the two cages by rotating the shaft 24 on which is mounted the cage 25. A shaft 50, having a driving pulley 52 thereon, is mounted in the bearings 18 beneath the drum 10 and on the opposite end of this shaft is a gear 54 arranged in mesh with a relatively larger gear 56 on a parallel shaft 58 journaled in the bearings 20. A spiral gear 60 on the shaft 50 is arranged to mesh with a like gear 62 on the vertical shaft 24 and a worm 64 on the shaft 58 is in mesh with a worm gear 66 on the lower end of the sleeve 22. Through these connections the pulley 52 is connected to rotate the first described cage 25 in a counterclockwise direction as shown by the arrow (Fig. 1) and to rotate the sleeve 22 in the same direction at a relatively slower speed.

The sleeve 16 is provided with a flange 70 to which is secured a scraper having a horizontal portion 72 and a vertical portion 74 extending upwardly along the side wall of the drum, a substantial clearance being provided between both parts of the scraper and the drum walls. The principal function of the scraper is to remove from the bottom and side walls of the drum the carbon black which would otherwise build up thereon in the form of a wall cake or shell and which would otherwise become thick enough to extend within the path of movement of the straps 38 and seriously vary the clearance between the side walls and the elements 32. It will be understood that to permit the product to build up on these walls would not only deleteriously affect the turbulent desired motion, reduce the effective capacity of the apparatus and increase the power consumption unnecessarily, but would produce a shearing and breaking up of the treated product and thus to some extent defeat the purpose of the treatment. The sleeve rotates the scraper at a reduced speed which is sufficient to keep the walls free from any substantial accumulation of wall cake, and by this arrangement shearing of the grains by the rotary cage or the scraper is substantially eliminated and the total amount of shearing in the apparatus is limited to a minimum.

The charge of flocculent carbon black may be introduced into the drum through an opening provided through the top wall at 80 and the finished product may be drawn off through a discharge pipe 82 in the bottom plate 12, a damper valve 84 being provided within the discharge pipe.

In operating the apparatus herein disclosed, the drum 10 may be filled nearly to its capacity with flocculent commercial carbon black, or, as already intimated, a mixture of commercial carbon black with a priming charge of spherical-grain carbon black. The shaft 50 is then driven to rotate the cage 25 in the direction of the arrow (Fig. 1), the scraper 72—74 rotating in the same direction at a greatly reduced speed. In an apparatus having a drum of 4 foot diameter, a cage speed of 45 R. P. M. and a scraper speed of 1½ R. P. M. have been found to be quite satisfactory. The result of this operation is that the charge of carbon black is stirred or churned into a state of turbulence in which the particles are subjected to multi-directional pressure by impact with other particles and by impact against the opposing and impelling surfaces and against the walls of the drum. Under these conditions there occurs an agglomeration of the particles resulting in a progressive and systematic building up of them into spherical granules having hammered or impact-formed surfaces which present the striking characteristics of high density and non-adherent, free-flowing contact with each other. In general, it may be stated that the apparent density of the carbon black may be brought to approximately 30 pounds per cubic foot. At this density the granules may be 250 mesh or larger in diameter.

Figures 2, 3, 4:
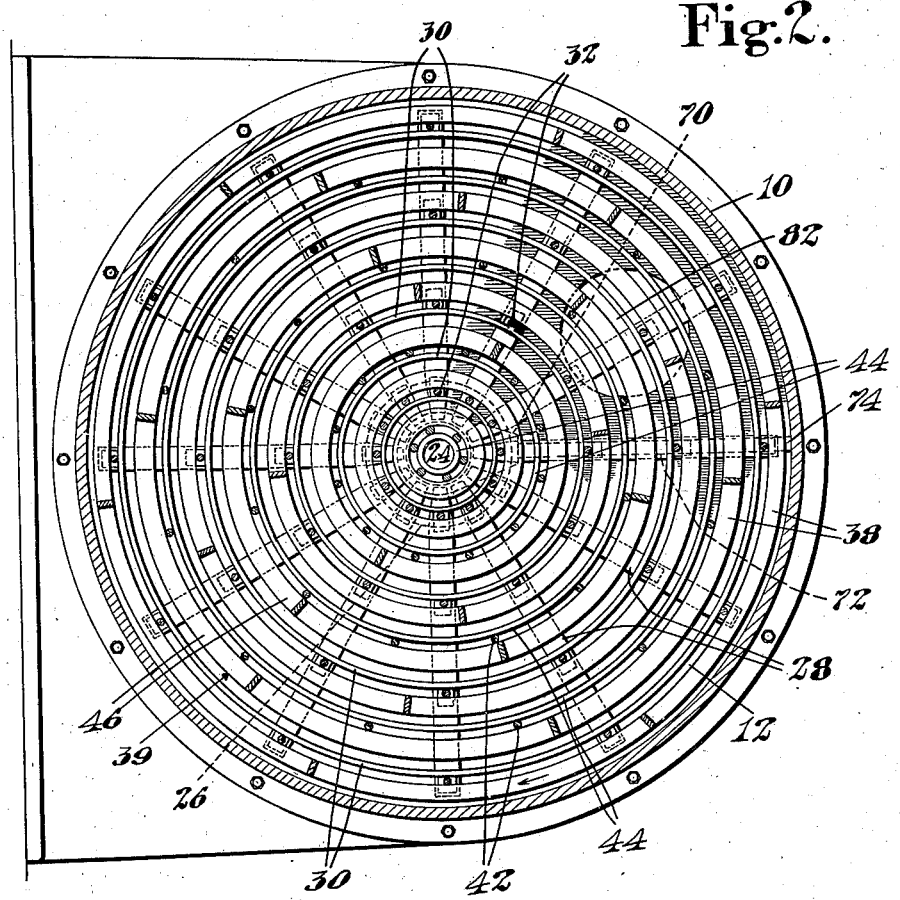
Fig. 2 is a plan view, partly in section, on the line 2—2 of Fig. 1.
Fig. 3 is a fragmentary view on an enlarged scale diagrammatically illustrating the movement of the carbon black particles in a horizontal direction in the apparatus.
Fig. 4 is a fragmentary view also on an enlarged scale in a vertical section diagrammatically illustrating the vertical movement of the carbon black in the apparatus.

In the light of our present knowledge, we may suggest one theory of what takes place within the drum to cause the carbon black to assume its new and relatively dense form by reference to Figs. 3 and 4 of the drawings. The stationary baffle elements 42 are arranged alternately with the moving elements 32 and the charge of carbon black surrounds and entirely fills the space between these elements. As the elements 32 move relative to the elements 42 (Fig. 3), always in parallel relation thereto, they tend to carry the carbon black in a mass therewith but such movement is opposed by the stationary elements 42. The result is that cones 86 and 87 of carbon black form both forwardly and rearwardly of the elements 32 and move along with these elements, while cones 88 and 89 of carbon black form both forwardly and rearwardly of the elements 42 remain stationary therewith. The carbon black intermediate the elements 32 and 42 (indicated by line 90 of particles in Fig. 3) is in a state of turbulence, the carbon black adjacent to the elements 32 moving nearly as fast as those elements and the carbon black adjacent to the elements 42 remaining nearly stationary. The relative positions of the elements are constantly changing as the elements 32 approach and recede from the elements 42 and, due to this action, the particles of carbon black are alternately being brought into most intimate and bombarding relation with each other whereby they are compacted into the relatively dense form of the finished product and into a relatively loose relation, wherein they are free to rearrange themselves for the next impact. Thus the carbon black particles are intermittently subjected to multi-directional pressures or impacts and are relatively rearranged between the successive impacts, such impacts or pressures thereby not occurring twice in succession in the same direction.

Simultaneously with the above action, the spiral straps 38 are acting constantly to move portions of the carbon black mass upwardly and thereby keep the product uniform from bottom to top. It will be understood that since the pressure of the carbon black increases with its depth, the nature of its turbulent and bombarding action will correspondingly vary from top to bottom. By constantly moving the carbon black from bottom to top, the entire charge is being continuously passed through the apparatus and thereby given a uniform treatment throughout. This upward movement of the carbon black by the spiral straps 38, is, however, opposed by the stationary spiral straps 46 which are secured to the elements 42. The result of this arrangement is somewhat illustrated in Fig. 4. Rotation of the spirals 38 tends to raise the carbon black upwardly, while centrifugal action may also somewhat move the black outwardly. That portion of the black located intermediate each two adjacent and concentric spirals 38 is intercepted by a spiral 46 which, in like manner, not only opposes such upward movement but tends to move the black downwardly, it being understood that in the apparatus illustrated, the mass of carbon black as a whole is also rotating in the drum though at a greatly reduced speed. When the shaft 24 and the cage 25 in this apparatus are rotating at 45 R. P. M., the mass of carbon black ordinarily rotates at about 4 R. P. M. Thus the spirals 38 and 46 not only serve to keep the product uniform from top to bottom but also set up an opposing motion of the carbon black in a substantially vertical direction, similar to the horizontal motion set up by the elements 32 and 42, which materially aids in developing the necessary pressure of impact of the black and its conversion into its final dense form. This movement and opposing action of the black are illustrated by the arrows and lines 92 of black particles in Fig. 4.

When the treatment of a charge of carbon black has been continued in this manner from 60 to 120 minutes, it will be found that practically the entire charge has been converted from its original flocculent condition to the granular form above defined, in which all the grains are substantially spherical in their general shape but in which they vary somewhat in size. This finished product may be withdrawn and used advantageously without further treatment. However, for convenience in operation we prefer to separate the granular carbon black thus formed into two lots of relatively coarse and fine grains, as by sifting it through mesh of suitable size. The proportion of carbon black in these portions depends upon the size of the mesh of the sifting screen used and we have operated very satisfactorily with a mesh which results in two substantially equal portions. The coarser portion may be withdrawn at this stage as finished product, while the fine portion may be used as a priming charge for the succeeding batch. The fine portion is, accordingly, returned to the chamber 80 and sufficient untreated carbon black added to form a new batch.

While we have referred to the treatment of each batch as requiring a period of from 60 to 120 minutes, this may be varied within certain limits. It should be noted, however, that if the coarse size grains are not separated in the manner above described, then the grains formed may exceed the stable dimensions and will thereupon be broken down into fragments of more or less irregular shape which are substantially free of dust. When this has once occurred, it is difficult and usually not necessary again to convert the resulting product into spherical granular condition.

It will be noted that the two skeleton cages 25 and 39 are disposed in telescopic relation and that their impelling or baffle elements 32 and 42 are alternately arranged in radially spaced relation. The distance between these cooperating elements appears to be of some importance in carrying out our process and we have found that a radial spacing or clearance of about one inch between adjacent elements 32 and 42 is quite satisfactory. The spiral straps 38 and 46 are arranged in a similar manner and may be located on the outer sides of their baffle elements for convenience in manufacturing the cages. The speed of relative rotation between the cages is also of importance in successfully carrying out the process and, as above stated, we have found that a relative rotation between 27 and 45 R. P. M. is very satisfactory.

In addition to the characteristics of relatively high density and non-coherent surface, the carbon black granules produced as above outlined are relatively tenacious in their structure. They cannot be crushed between the fingers by normal pressure, although they may be readily crushed against a hard surface or by rubbing which subjects them to shearing stress between the fingers.

While we have explained to some extent a theory of the formation of the dense spherical granules which it is the object of our invention to produce, it should be understood that the exact nature and cause of the results attained are not at present fully understood and that there are undoubtedly other important factors in the phenomenon which will become apparent upon further practice of the process herein disclosed.

It is believed, however, that never heretofore has flocculent carbon black been systematically and progressively built up in a dry state, without the assistance of binders, solvents, liquids, tars or other addition, either temporarily or permanently, of any foreign substance, in such a manner as to transform flocculent carbon black into substantially dustless, tenacious granules, the particles of which are united only by their own cohesive force with sufficient tenacity of structure to resist disintegration when transported in bulk.

In the treatment of flocculent carbon black in the manner above outlined, the movable spiral straps 38 have the important function of lifting and lightening the charge in the apparatus thus preventing a high pressure head from developing at the bottom of the apparatus. At the same time they cause the process to be carried on while the charge is lightened by entrained air. The straps therefore adapt the apparatus to handle larger charges of carbon black than it would be otherwise practical to treat and in general lightens the charge so as to allow impact of the particles to take place freely without development of pressure which might retard the conversion process. To illustrate more fully what we have in mind in this respect, it may be noted that if baffle rods are moved through a mass of carbon black three or more feet below the top, sufficient pressure and packing of the mass may be developed to retard the formation of the granules and that this tendency is obviated by the action of the spiral straps 38.

Having thus described our invention, what we claim as new and desire to secure by Letters Patent is:

1. Apparatus for treating carbon black and the like, comprising a container providing a chamber, a plurality of parallel baffle rods distributed substantially uniformly in spaced and circular relation throughout the entire chamber, a rotary member in the chamber, a plurality of circularly arranged impelling rods carried by the member and movable therewith past the baffle rods in an approaching and receding manner and always in parallel relation as the member rotates, and spiral propelling means located substantially within the area traversed by the impelling rods for moving the impelled product in a direction substantially parallel with the axis of rotation of the member.

2. The combination of claim 1, in which a plurality of circular rows of baffle rods are respectively arranged alternately with respect to a plurality of circular rows of impelling rods cooperating therewith, and in which a spiral product-moving device is carried by each row of impelling rods.

3. Apparatus for treating carbon black and the like, comprising a container providing a chamber, two substantially cylindrical skeleton cages disposed in telescopic relation therein and having respectively longitudinally-extending impelling and baffle elements disposed in parallel relation and alternately spaced, thereby permitting relative rotation of the cages, means for rotating one of the cages relative to the other and thereby causing an agglomerative powder to assume a granular form, and rotary means within the chamber for simultaneously moving the said product longitudinally of said elements.

4. Apparatus for treating carbon black and the like, comprising a container providing a chamber, two substantially cylindrical skeleton cages disposed in telescopic relation therein and having respectively vertically-extending impelling and baffle elements disposed in parallel relation and alternately spaced thereby permitting a relative rotation of the cages, means for rotating one of the cages relative to the other whereby to cause an agglomerative powder to assume granular form, and a spirally arranged strap carried by said one cage and adapted to move the granular product upwardly.

5. Apparatus for treating carbon black and the like, comprising a container providing a chamber, two substantially cylindrical skeleton cages disposed in telescopic relation therein and having respectively longitudinally-extending impelling and baffle elements disposed in parallel relation and alternately radially spaced, means for rotating one of the cages relative to the other to cause flocculent carbon black to assume granular form, a spirally arranged strap carried by said one cage and adapted to move the carbon black of the mass longitudinally in one direction, and a spirally arranged strap carried by the other cage adapted to oppose movement of the carbon black by the first-mentioned strap.

6. Apparatus for treating flocculent products, comprising a vertically disposed cylindrical container, a rotary cage having a plurality of parallel vertical impelling rods therein of substantially uniform cross section, a stationary support having a plurality of parallel vertical baffle rods, the impelling and baffle rods being arranged in spaced concentric circles and being relatively movable always in parallel relation to subject the product to turbulent pressure, and a plurality of spiral elements some carried by the baffle rods and some by the impelling rods.

7. Apparatus for treating flocculent products, comprising a vertically disposed cylindrical tank, a driven cage having upstanding parallel impelling rods, and a stationary cage having depending parallel baffle rods, the impelling and baffle rods being arranged in spaced concentric circles and being relatively movable always in parallel relation to subject the product to turbulent pressure, means for lifting portions of the mass of the product while the driven cage is in motion, and means for removing wall cake from the walls of the tank.

8. Apparatus for converting dry agglomerative powders into a granular state, comprising a container providing a chamber, a plurality of baffle elements distributed uniformly in spaced relation throughout the entire chamber, a rotary member in the chamber having a plurality of impelling elements thereon presenting acting faces which are always parallel to those of the baffle elements and which are movable with respect to the baffle elements in an approaching and receding manner as said member rotates, and rotary propelling means located within the area traversed by the impelling elements for moving portions of the product in a direction substantially parallel with the axis of rotation of said member.

9. Apparatus for converting dry agglomerative powders into a granular state, comprising a container providing a chamber, a plurality of upright baffle elements distributed substantially uniformly throughout the entire chamber, a rotary carrier in the chamber, a plurality of impelling elements arranged in substantially parallel relation and disposed upon all sides of the axis of said carrier, said elements being movable with the carrier past the baffle elements in an approaching and receding manner and always in parallel relation, thereby subjecting the material treated to uniform agitation throughout its mass, a scraper located in the chamber, and means for moving the scraper in a circular path along the walls thereof.

EDMUND BILLINGS.
HAROLD H. OFFUTT.